US012785303B2

(12) United States Patent
Zhang et al.

(10) Patent No.: US 12,785,303 B2
(45) Date of Patent: Nov. 3, 2026

(54) CONNECTING TERMINAL FOR CONNECTING INSULATED WIRES

(71) Applicant: Tyco Electronics (Shanghai) Co., Ltd., Shanghai (CN)

(72) Inventors: Zhimin Zhang, Shanghai (CN); Tongbao (Tim) Ding, Shanghai (CN); Yongjian (Justin) Huang, Shanghai (CN); Jinyu Zhang, Shanghai (CN); Zhongxi Huang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 328 days.

(21) Appl. No.: 18/407,534

(22) Filed: Jan. 9, 2024

(65) Prior Publication Data

US 2024/0235068 A1 Jul. 11, 2024

(30) Foreign Application Priority Data

Jan. 9, 2023 (CN) ......................... 202310026798.6

(51) Int. Cl.
*H01R 4/72* (2006.01)
*H01R 4/2404* (2018.01)

(52) U.S. Cl.
CPC ............. *H01R 4/72* (2013.01); *H01R 4/2404* (2013.01)

(58) Field of Classification Search
CPC ................................... H01R 4/72; H01R 4/22
USPC .................................. 439/910; 174/84 R, 87
See application file for complete search history.

(56) References Cited

U.S. PATENT DOCUMENTS 3,113,553 A * 12/1963 Schinske .................. H01R 4/22 174/84 R
3,497,607 A * 2/1970 Swanson .................. H01R 4/22 403/396
3,519,707 A * 7/1970 Krup ........................ H01R 4/22 264/249
5,557,069 A * 9/1996 Whitehead ............... H01R 4/26 403/396
7,368,663 B1 * 5/2008 Fisher .................... H02G 15/04 174/77 R

* cited by examiner

*Primary Examiner* — Phuong K Dinh
(74) *Attorney, Agent, or Firm* — Barley Snyder

(57) ABSTRACT

A connecting terminal is adapted to connect a plurality of insulated wires together and includes a terminal body and a cap. The terminal body defines a receiving cavity having an inner wall. The inner wall includes a toothed structure adapted to pierce through insulation layers of the insulated wires in response to crimping of the terminal body. The cap is sleeved over the terminal body and is adapted to insulate the terminal body from an external environment.

21 Claims, 2 Drawing Sheets

CONNECTING TERMINAL FOR CONNECTING INSULATED WIRES

CROSS-REFERENCE TO RELATED APPLICATIONS

This application claims the benefit of Chinese Patent Application No. 202310026798.6, filed Jan. 9, 2023, the whole disclosure of which is incorporated herein by reference.

FIELD OF THE INVENTION

The present disclosure relates to the technical field of electrical connectors, and in particular, to a connecting terminal for insulated wires.

BACKGROUND

Existing terminals with internal toothed features are typically U-shaped, and can be used to conductively connect enameled or otherwise insulated wires. However, after the terminal is connected with the enameled wires by crimping, a user must further provide a heat shrinking sleeve or a plastic sleeve to insulate the terminal from the outside. The specific process of the prior art is as follows: 1) the terminal and the enameled wires are conductively connected by crimping with a crimping machine to obtain a terminal connected with the wires; and 2) the heat shrinking sleeve or plastic sleeve is sleeved outside the terminal connected with the wires, so as to insulate the terminal from the outside and obtain an insulated terminal. The process is complicated and labor intensive, which is not conducive to the popularization and application of the product.

SUMMARY

According to an embodiment of the present disclosure, a connecting terminal is adapted to connect a plurality of insulated wires together and includes a terminal body and a cap. The terminal body defines a receiving cavity having an inner wall. The inner wall has a toothed structure or toothing adapted to pierce through insulation layers of the insulated wires in response to crimping of the terminal body. The cap is sleeved over the terminal body and is adapted to insulate the terminal body.

BRIEF DESCRIPTION OF THE DRAWINGS

The invention will now be described by way of example with reference to the accompanying Figures, of which.

DETAILED DESCRIPTION OF THE EMBODIMENTS

Figure 1:
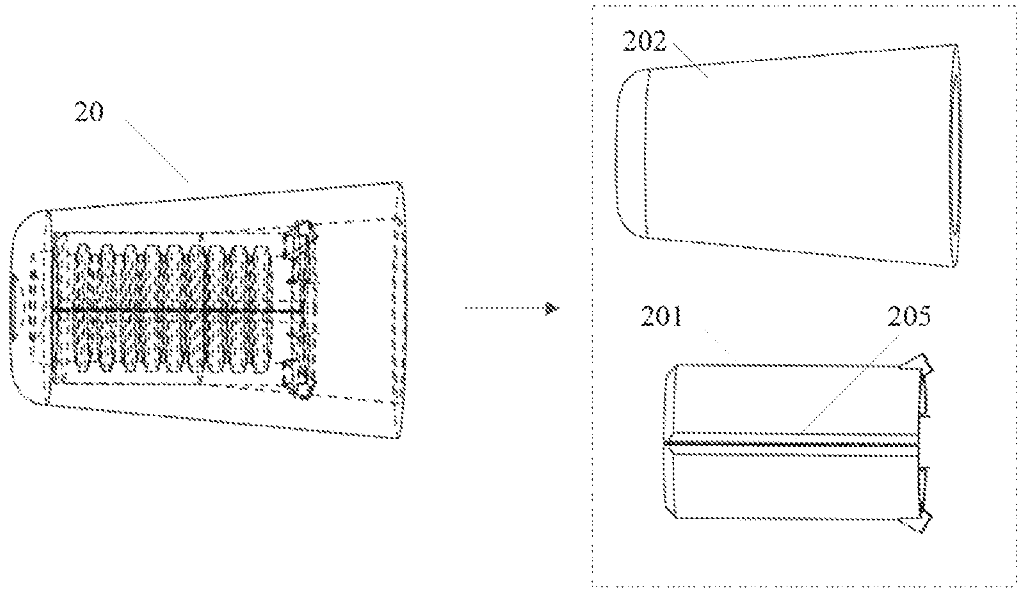
FIG. 1 is a perspective view and an exploded view of a connecting terminal according to an embodiment of the present disclosure.

Exemplary embodiments of the present disclosure will be described hereinafter in detail with reference to the attached drawings, wherein the like reference numerals refer to the like elements. The present disclosure may however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terminals described herein are used to facilitate the connection of wires. Connecting wires by terminals rather than by welding or winding is convenient and fast. In some examples, the connecting terminals described herein may be made into specialized terminal blocks or terminal boxes, where the connecting terminals may be single-layered, double-layered, current indicating, voltage indicating, common, disconnectable, etc. In some examples, the connecting terminals may be designed as a European connecting terminal series, a plug-type connecting terminal series, a transformer connecting terminal, a building terminal block, a fence-type connecting terminal series, a spring-type connecting terminal series, a rail-type connecting terminal series, a through-wall connecting terminal series, or a photoelectric coupling connecting terminal series, etc.

Figure 2:
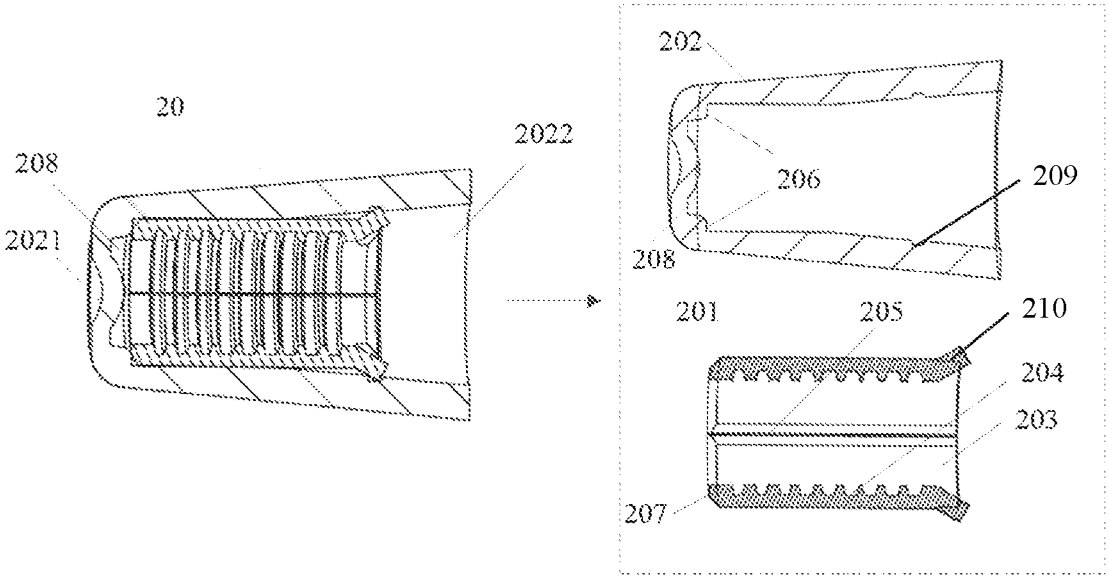
FIG. 2 is a cross-sectional view and a sectional exploded view of the connecting terminal according to an embodiment of the present disclosure.

As shown in FIGS. 1 and 2, an embodiment of the present disclosure provides a connecting terminal 20 for connecting multiple wires each having an insulating layer. Specifically, FIG. 1 shows a perspective view and an exploded view of the connecting terminal 20, and FIG. 2 shows a cross-sectional view and a sectional exploded view of the connecting terminal 20. As shown in the drawings, the connecting terminal 20 includes a terminal body 201 and an insulating cap 202. The terminal body 201 is provided with a receiving cavity 203 having an inner wall provided with a toothed structure 204. The insulating cap 202 is sleeved outside the terminal body 201. When the connecting terminal 20 is connected with the wire by crimping, the toothed structure 204 of the inner wall of the terminal body 201 pierces through the insulating layer of the wire and conductively connects with the wire. The insulating cap 202 insulates the wire and the terminal body 201 from the outside.

The terminal body 201 is made of conductive material optionally including copper, aluminum, nickel, copper alloy, nickel alloy, silver plated copper, zinc plated copper, etc. The terminal body 201 defines the receiving cavity 203 having the toothed inner wall. This toothed structure 204 may be defined by teeth of one or more types, such as any one or more combinations of a conical tooth, an oblique grinding tooth, a trapezoidal tooth, a trapezoidal-flat tooth, a triangular tooth, an arc tooth, a chamfered tooth, or a flat tooth. The toothed structure 204 may be formed by molding or by turning, by way of example only.

The insulating cap 202 is sleeved on the terminal body 201, and is used for insulating the terminal body and the wires connected to the terminal body from the outside. The insulating cap 202 may optionally be a fiberglass sleeve, a silicone insulating sleeve, a silicone rubber insulating sleeve, a polyurethane insulating sleeve, an acrylate insulating sleeve, a PVC sleeve, a heat shrinking sleeve, and so on. Further, in some examples, the insulating cap 202 may optionally be made of flame retardant, sealing, corrosion resistant, wear resistant, or high temperature resistant material.

Preferably, the terminal body 201 is of a cylindrical structure, which is beneficial to allowing the terminal body to be uniformly stressed during connecting with the wire by crimping. In this way, the toothed structure 204 of the inner wall of the terminal body 201 can better pierce through the insulating layer of the wire, thereby achieving the conductive connection between the terminal body and the wire. In some examples, the cylindrical structure of the terminal body 201 is formed by welding two ends (FIG. 2 shows a weld 205). The toothed structure 204 of the inner wall of the terminal body 201 may be formed by molding. Specifically, a metal plate having a toothed structure is first formed by molding. After, the two ends of the metal plate are spliced together and fixed by welding, thereby obtaining a terminal body of the cylindrical structure. If the terminal gap is connected or fixed via welding, the terminal body 201 is more uniformly stressed during the crimping process. In this way, there is no need to specially define a placement form of the terminal for welding, so that a more reliable piercing effect can be obtained. In some other examples, the cylindrical structure of the terminal body 201 is integrally formed, that is, a blank is turned into a cylindrical structure, so that there is no need for subsequent splicing. As a result, the terminal 20 has a more uniform conductivity and improved performance. Further, the inner wall of the cylindrical structure is further processed by turning to form the desired toothed structure 204. A turning process is used throughout the process, which is convenient for stream line operation and improves production efficiency.

In some examples, the insulating cap 202 is a plastic shell with one side closed. The one-closed-side arrangement of the insulating cap 202 can effectively protect the connection area and also enhance the insulating capacity. Preferably, the plastic shell or insulating cap 202 is made of a transparent or translucent material. A stop portion 206 is provided at a position close to the closed side of the plastic shell or insulating cap 202. The stop portion 206 cooperates with an outlet end 207 of the terminal body 201 to form and retain an observation window 208 between the closed side 2021 of the insulating cap 202 and the terminal body 201. The observation window 208 is a section of the insulating cap 202 corresponding to a gap between the closed side of the insulating cap 202 and the outlet end of the terminal body 201, that is, a corresponding section of the insulating cap 202 between the closed side thereof and the stop portion 206. Since the insulating cap 202 is made of a transparent or translucent material, and a gap is reserved between the terminal body and the closed side of the insulating cap by means of the stop portion 206, the user can observe an insertion position of the internal wire through the plastic shell or insulating cap. The provision of the observation window is convenient for the worker to observe the position state of the wire, thereby reducing the probability of installation error, avoiding the contact between the wire and the outside, and reducing the impact of the use environment on the connection.

Preferably, an opening of the insulating cap 202 gradually expands from the closed side 2021 to an open side 2022 so that the insulating cap can accommodate wires of different specifications or numbers, which is beneficial to ensuring that the insulating plastic shell can completely cover the wires. In the drawings herein, the opening of the insulating cap 202 uniformly or linearly expands from the closed side 2021 to the open side 2022, while in some other examples, the opening of the insulating cap 202 may abruptly expand from the closed side 2021 to the open side 2022, as long as the inner wall thereof can guide the wires to insert smoothly.

In a preferred embodiment of the present disclosure, the inner wall of the insulating cap 202 is provided with a groove 209 and the terminal body 201 is provided with a barb 210. The groove 209 cooperates with the barb 210 to prevent the terminal body 201 from falling out. The cooperation structure of the groove 209 and the barb 210 enables a stable connection between the terminal body 201 and the insulating cap 202. Further, the terminal body 201 and the insulating cap 202 are difficult to separate and fall off either before or after connection with the wires by crimping. In other examples, a barb may be provided on the inner wall of the insulating cap 202 and a groove may be provided on the terminal body, which can also achieve the function of preventing the terminal body from falling off.

In another preferred embodiments, the outer surface of the terminal body 201 has a knurled structure to increase the frictional force between the contact surfaces of the terminal body and the insulating cap 202. This improves the stability of the overall structure of the product and prevents the insulating cap 202 and the terminal body 201 from abnormally separating.

When the connecting terminal according to the present embodiment is connected with the wire by crimping, the toothed structure of the inner wall of the terminal body pierces through the insulating layer of the wire and conductively connects with the wire, and the insulating cap insulates the wire and the terminal body from the outside. The present embodiment realizes the pre-insulation wrapping of the terminal, and simplifies the assembly process on the customer side. The conduction between the terminal and the wire and the insulation between the terminal and the outside can be achieved by crimping one time, reducing the labor cost. Further, the sharp edge of the terminal body is not exposed, so that the relevant equipment such as motor winding will not be scratched during the manufacturing process.

The connecting terminal is especially applicable to winding wire, and more particularly to enameled wire. For example, it is applicable to winding wire, such as polyester enameled wire and modified polyester enameled wire, used in working applications such as motors, electrical appliances, instruments, and transformers; or it is applicable to winding wire, such as polyesterimide enameled wire, polyimide enameled wire, polyester enameled wire, polyester-imide/polyamideimide composite enameled wire, used in working applications with temperature of 180 degrees Celsius and above, such as motors, electrical appliances, instruments, and transformers; or it is applicable to the winding wire having certain quality characteristic requirement and used in specific occasions, such as polyurethane enameled wire (flash-soldering), and self-adhesive enameled wire.

Figure 3A:
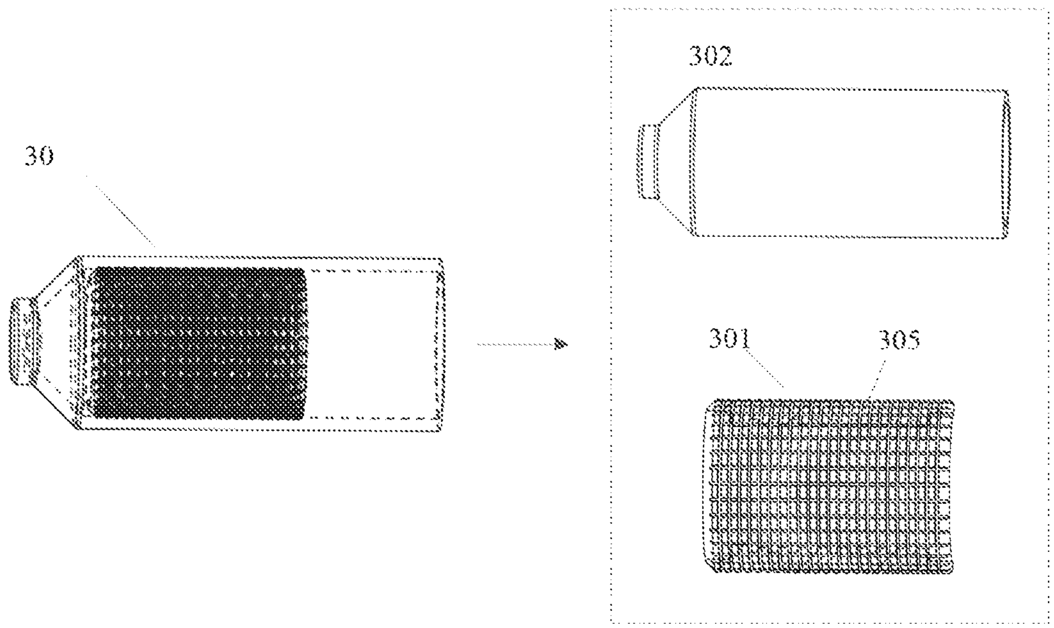
FIG. 3*a* is a perspective view and an exploded view of the connecting terminal according to another embodiment of the present disclosure.
Figure 3B:
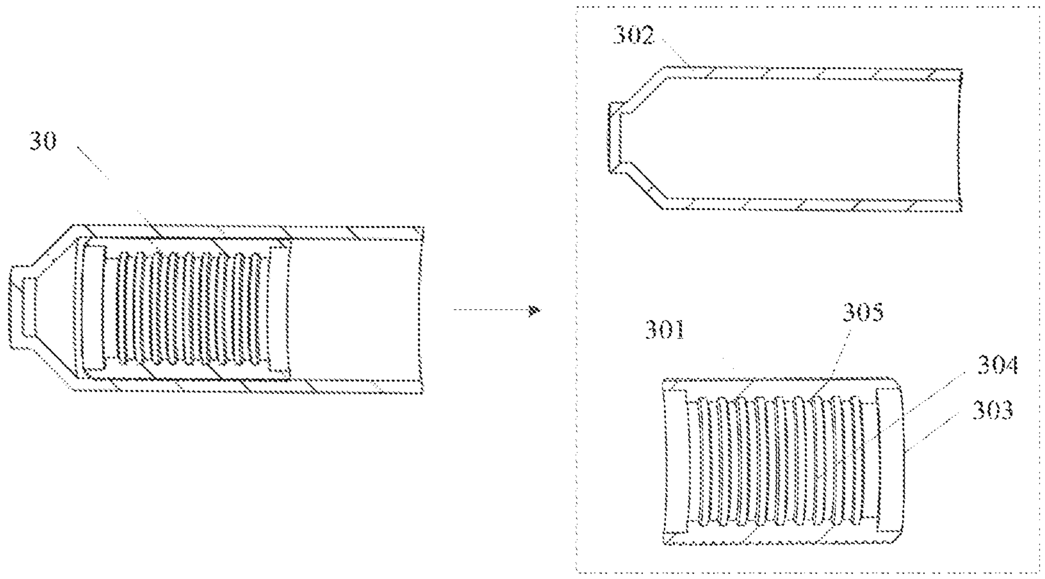
FIG. 3*b* is a cross-sectional view and a sectional exploded view of the connecting terminal according to another embodiment of the present disclosure.

As shown in FIGS. 3*a* and 3*b*, another embodiment of the present disclosure includes a connecting terminal 30. Specifically, FIG. 3*a* shows a perspective view and an exploded view of the connecting terminal 30, and FIG. 3*b* shows a cross-sectional view and a sectional exploded view of the connecting terminal 30. As shown in the drawings, the connecting terminal 30 includes a terminal body 301 and an insulating cap 302. The terminal body 301 is provided with a receiving cavity 303. An inner wall of the receiving cavity 303 is provided with a toothed structure 304. The insulating cap 302 is sleeved outside the terminal body 301. When the connecting terminal 30 is connected with the wire by crimping, the toothed structure 304 of the inner wall of the terminal body 301 pierces through the insulating layer of the wire and conductively connects with the wire, and the insulating cap 302 insulates the wire and the terminal body 301 from the outside.

The insulating cap 302 in the present embodiment is a heat shrinking sleeve with one side closed to effectively protect the connection area and also enhance the insulating capacity, and is especially applicable to the application scenarios having sealing requirements. The insulating cap 302 may be made, at least partially, of polyolefin material. In one embodiment, its outer layer is made of high-quality and soft crosslinked polyolefin material and its inner layer is made of hot melt adhesive. The outer layer material has the characteristics of insulation, corrosion prevention and abrasion resistance, and the inner layer has the advantages of low melting point, waterproof sealing and high adhesion. The heat shrinking sleeve can not only achieve insulation, but also achieve the function of sealing protection. The insulating cap 302 may be a PVC heat shrinking sleeve, a PET heat shrinking sleeve, or a rubber-containing heat shrinking sleeve. The external surface of the terminal body 301 is processed into a knurled structure 305, which can increase the frictional force between the contact surfaces of the terminal body 301 and the insulating cap 302, and prevent the heat shrinking sleeve from loosening. The inner wall of the terminal body 301 is of a tool escape structure, which is beneficial to the processing of product.

In a preferred embodiment of the present disclosure, the terminal body 301 is of a cylindrical structure, that is, a closed cylindrical terminal, so that the terminal body can be uniformly stressed during crimping, thereby obtaining a more reliable piercing effect. In some examples, the cylindrical structure of the terminal body 301 is formed by welding two ends, and the toothed structure 304 of the inner wall of the terminal body may be formed by molding. Specifically, a metal plate having a toothed structure is first formed by molding, and then two ends of the metal plate are spliced together and then fixed by welding, thereby obtaining a terminal body of the cylindrical structure. With the terminal gap is connected by welding, the terminal body is more uniformly stressed during the crimping process. Further, there is no need to specifically define a placement or orientation of the terminal for welding, so that a more reliable piercing effect can be obtained. In some other examples, the cylindrical structure of the terminal body is integrally formed, that is, a blank is turned into a cylindrical structure, so that there is no need for subsequent splicing, and the terminal has a more uniform conductivity and better performance. FIGS. 3*a* and 3*b* show an integrally formed cylindrical terminal body. Further, the inner wall of the cylindrical structure is further processed by turning to form the desired toothed structure. A turning process is used throughout the process, which is convenient for stream line operation and improves production efficiency.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connecting terminal, adapted to connect a plurality of insulated wires, comprising:

a terminal body defining a receiving cavity, an inner wall of the receiving cavity including a toothed structure adapted to pierce through insulation layers of the insulated wires in response to crimping of the terminal body; and an insulating cap sleeved over the terminal body, the insulating cap is a heat shrink sleeve with one closed side and one open side.

2. The connecting terminal according to claim 1, wherein the terminal body defines a cylindrical structure.

3. The connecting terminal according to claim 2, further comprising a weld formed along a length of the terminal body and joining two edges of the terminal body for defining the cylindrical structure.

4. The connecting terminal according to claim 3, wherein the toothed structure is a molded toothed structure.

5. The connecting terminal according to claim 2, wherein the toothed structure of the inner wall of the terminal body is formed by turning.

6. The connecting terminal according to claim 1, wherein the insulating cap is a plastic shell with one closed side and one open side.

7. The connecting terminal according to claim 6, wherein the plastic shell is made of a transparent or translucent material.

8. The connecting terminal according to claim 7, wherein a stop is defined at a position proximate to the closed side of the plastic shell.

9. The connecting terminal according to claim 8, wherein the stop cooperates with an end of the terminal body to create an observation window between the closed side of the plastic shell and the terminal body, the observation window enabling observation of an insertion position of a wire inserted into the receiving cavity of the terminal body.

10. The connecting terminal according to claim 6, wherein an opening of the plastic shell gradually expands from the closed side to the open side so as to accommodate wires of different specifications or numbers.

11. The connecting terminal according to claim 6, wherein an inner wall of the plastic shell defines a recess.

12. The connecting terminal according to claim 11, wherein the terminal body defines a radially extending barb on an end thereof, the barb engaging with the recess to retain the terminal body within the plastic shell.

13. The connecting terminal according to claim 12, wherein the recess defines an annular groove formed into the inner wall.

14. The connecting terminal according to claim 1, wherein an outer surface of the terminal body defines a knurling increasing a frictional force between contact surfaces of the terminal body and the heat shrink sleeve.

15. A connecting terminal, comprising:

a terminal body defining a cavity adapted to receive a plurality of insulated wires, an inner wall of the cavity including a plurality of annular teeth arranged radially about the cavity and adapted to pierce through insulation layers of the insulated wires in response to crimping of the terminal body; and a transparent or translucent insulating cap sleeved over the terminal body, the cap having at least one stop formed on a closed end thereof and extending toward an open end thereof, with the terminal body inserted into the insulating cap and abutting the at least one stop, a gap is formed between the closed end of the cap and the terminal body.

16. The connecting terminal according to claim 15, wherein the gap defines an observation window positioned to enabling viewing of a wire inserted into the terminal body.

17. The connecting terminal according to claim 16, wherein the at least one stop is arranged annularly about the closed end of the cap and defines a circular observation window.

18. The connecting terminal according to claim 15, wherein an inner wall of the cap defines an annular recess formed therein.

19. The connecting terminal according to claim 18, wherein the terminal body defines a plurality of barbs on an end thereof, the barbs engaging with the recess to retain the terminal body within the cap.

20. A connecting terminal, adapted to connect a plurality of insulated wires, comprising:

a terminal body defining a cylindrical structure and a receiving cavity, an inner wall of the receiving cavity including a toothed structure adapted to pierce through insulation layers of the insulated wires in response to crimping of the terminal body;

an insulating cap sleeved over the terminal body; and a weld formed along a length of the terminal body and joining two edges of the terminal body for defining the cylindrical structure.

21. A connecting terminal, adapted to connect a plurality of insulated wires, comprising:

a terminal body defining a cylindrical structure and a receiving cavity, an inner wall of the receiving cavity including a toothed structure adapted to pierce through insulation layers of the insulated wires in response to crimping of the terminal body, the toothed structure of the inner wall of the terminal body is formed by turning; and an insulating cap sleeved over the terminal body.

* * * * *